May 19, 1964   A. PERROT   3,133,368
SLIDE MOUNTING FOR TRANSPARENCIES
Filed June 27, 1962
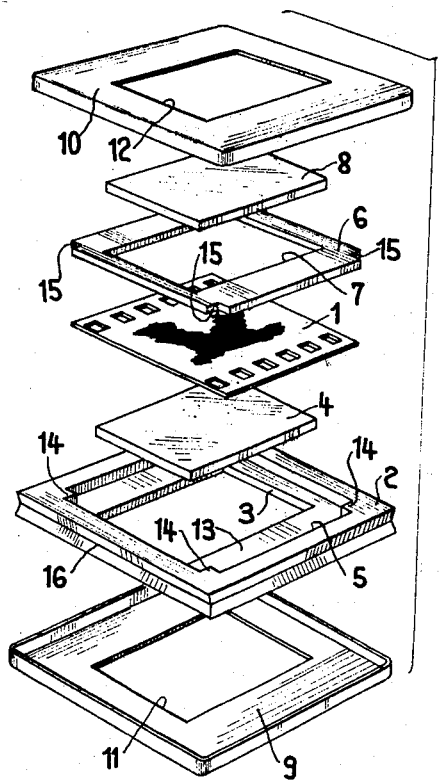
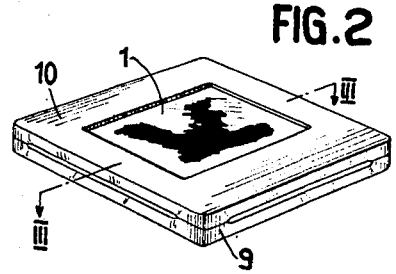
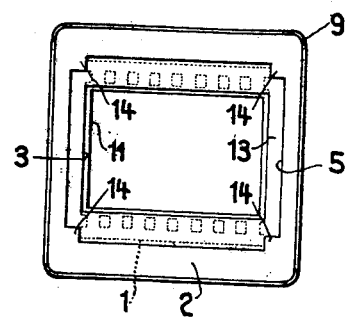
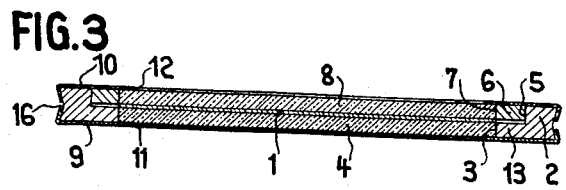
INVENTOR
Arnold Perrot
BY
ATTORNEY 3,133,368
SLIDE MOUNTING FOR TRANSPARENCIES
Arnold Perrot, Martiweg 4, Nidau (Biel), Switzerland
Filed June 27, 1962, Ser. No. 205,653
Claims priority, application Switzerland Sept. 27, 1961
6 Claims. (Cl. 40—152)

The invention concerns a slide mounting for transparencies, comprising a main frame with a window for receiving a first protecting glass and with a recess for receiving and guiding a transparency, an auxiliary frame to be adjusted in the said recess and provided with a window for receiving a second protecting glass identical to the said first protecting glass, and two covers each provided with a window having slightly smaller dimensions than the said first and second protecting glasses, the said covers destined to be fixed to the said main frame for holding in position the said protecting glasses and the said auxiliary frame.

The slide mounting according to the invention is characterized in that an interior shoulder of the said main frame has a thickness equal to the thickness of the said first protecting glass so that the upper face of the said first protecting glass lies flush with the upper face of the said interior shoulder, in that the said auxiliary frame has a thickness equal to the thickness of the said second protecting glass so that the upper face of the said second protecting glass lies flush with the upper face of the said auxiliary frame, and in that the depth of the said recess is equal to the sum of the thicknesses of the transparency and the said auxiliary frame, so that the upper face of the said auxiliary frame lies flush with the upper face of the said main frame.

The accompanying drawings illustrate, by way of example, one embodiment of the slide mounting according to my invention.

FIG. 1 is a perspective view of the slide mounting with its various component parts separated from one another.

FIG. 2 is a perspective view of the assembled and locked slide mounting.

FIG. 3 is, on a larger scale, a sectional view along the line III—III of FIG. 2 of the assembled and locked slide mounting.

FIG. 4 is a plan view of the main frame equipped with one of the covers and one of the protecting glasses, the transparency being shown in dotted lines.

The slide mounting for transparencies as shown in the drawings serves to hold and protect an unframed transparency 1, i.e. a transparency which is not premounted in a support formed of two cardboard sheets. The mounting comprises a main frame 2 with a window 3 for receiving a first protecting glass 4 and with a recess 5 for receiving and guiding the transparency 1, an auxiliary frame 6 adjusted in the recess 5 of the main frame 2 and provided with a window 7 for receiving a second protecting glass 8 equal in size to the glass 4, and two pan-shaped covers 9 and 10 having rectangular windows 11 and 12 with dimensions slightly smaller than the dimensions of the protecting glasses 4 and 8; said covers 9 and 10 being provided to be fixed to the main frame 2 to hold the protecting glasses 4 and 8 and the auxiliary frame 6 in place. The windows 3 and 7 are of exactly the same dimensions.

The main frame 2 and the auxiliary frame 6 may, for instance, be made of plastics, while the covers 9 and 10 consist of metal, for instance of aluminium.

The interior shoulder 13 of the main frame 2 has a thickness equal to that of the first protecting glass 4, as seen from FIG. 3, so that the upper face of the first protecting glass 4 lies flush with the upper face of the shoulder 13. On the other hand, the auxiliary frame 6 has a thickness equal to that of the second protecting glass 8, that is, equal to the thickness of the shoulder 13 so that the upper face of the second protecting glass 8 lies flush with the upper face of the auxiliary frame 6. Finally, the depth of the recess 5 of the main frame 2 is equal to the sum of the thicknesses of the transparency 1 and the auxiliary frame 6, so that the upper face of the auxiliary frame 6 lies flush with the upper face of the main frame 2.

The recess 5 of the main frame 2 is of substantially rectangular shape which, in the corners, is interrupted by projections 14. The auxiliary frame 6 corresponds in shape to that of the recess 5 and, in its corners, has notches 15 corresponding to the projections 14.

The outer edges of the main frame 2 have grooves 16 with a V-shaped cross section, the raised edges or flanges of the cover 9 and 10 being adapted to be folded onto the walls of the grooves 16. The thickness of the covers 9 and 10 is very small compared with the thickness of the main frame 2. For fixing the covers 9 and 10 to the main frame 2, an apparatus as shown and described in Swiss Patent No. 319,603 is preferably used. The folded-in position of the edges of the covers 9 and 10 is shown in FIGS. 2 and 3. In this way, the auxiliary frame 6 is held in the recess 5 of the main frame 2 by the cover 10.

When the slide mounting according to the invention is put on sale, the first cover 9 has already been fixed to the main frame 2 (FIG. 4) so that, for assembling and locking the mounting, only the following operations are to be executed: inserting the glass 4 into the window 3 of the main frame 2, introducing the transparency 1 into the recess 5 of the main frame 2, placing the auxiliary frame 6 and the glass 8, and fixing the second cover 10.

When the transparency 1 is inserted into the recess 5 of the main frame 2, it occupies the position shown in dotted lines in FIG. 4. Therefore, the transparency 1 is perfectly guided by the projections 14 of the main frame 2. When the auxiliary frame 6 is put in place it bears against the perforated marginal portions of the transparency 1 and holds the later in position; however, the auxiliary frame 6 does not bear against the short edges of the transparency 1, as is clearly shown in FIG. 4. Once the slide mounting being assembled and locked (FIG. 3), the transparency 1 is clamped between the two protecting glasses 4 and 8. In order to avoid formation of diffraction figures (rings or fringes of Newton), slightly mat glasses 4 and 8 are preferably used.

As aforesaid, the two protecting glasses 4 and 8 are identical; they have, in particular, the same thickness so that the slide mounting is symmetrical, the thickness of its portions is the same at both sides of the transparency 1.

In consequence, the outer faces of the slide mounting are both at the same distance from the median plane of the transparency 1. Therefore, the transparency 1 may be inserted into the mounting in any sense, without considering its face carrying the photographic emulsion layer.

As shown in FIG. 2, the edges or flanges of the covers 9 and 10 are not folded down into the grooves 16 up to their ends; they remain upright in reach of the corners of the mounting. Therefore, the mounting is substantially reinforced in the corners and the latter remain very smooth, as no material accumulated by the folding of the edges of the covers occurs in the corners and projects beyond the prescribed dimensions of the mounting.

The covers 9 and 10, though very thin, prevent the frames 2 and 6 from being scratched when the mounting is inserted into a projector.

In a modified embodiment, the main frame 2 can consist of two pieces, namely an outer thick piece and an inner piece identical to the auxiliary frame 6.

The cost price of the slide mounting according to the invention is very low since the dimensions of the protecting glasses 4 and 8 are reduced with regard to those of prior constructions in which the protecting glasses cover the perforations of the transparency.

I claim:

1. A slide mounting for transparencies, comprising a main frame having a recess for receiving a transparency, the recess provided with a window in the bottom thereof for receiving a first protecting glass, an auxiliary frame positioned in the said recess and provided with a window for receiving a second protecting glass identical to the said first protecting glass, and two covers each provided with a window having slightly smaller dimensions than the said first and second protecting glasses, the said covers adapted to be fixed to the said main frame for holding in position the said protecting glasses and the said auxiliary frame, characterized in that the main frame at said window is of a thickness equal to the thickness of the said first protecting glass so that the upper face of the said first protecting glass lies flush with the upper face of the inner edge of said window, in that the said auxiliary frame has a thickness equal to the thickness of the said second protecting glass so that the upper face of the said second protecting glass lies flush with the upper face of the said auxiliary frame, and in that the depth of the said recess is equal to the sum of the thicknesses of the transparency and the said auxiliary frame, so that the upper face of the said auxiliary frame lies flush with the upper face of the said main frame.

2. A slide mounting according to claim 1, characterized in that the said recess of the main frame has a substantially rectangular shape interrupted in the corners by projections for guiding the transparency, and the said auxiliary frame cooperates in shape with the said recess by having its corners notched corresponding to said projections.

3. A slide mounting according to claim 1, characterized in that the said auxiliary frame is dimensioned so as to bear solely against the perforated marginal portions of the transparency, the transparency being clamped between the said two protecting glasses upon the mounting being assembled and locked.

4. A slide mounting according to claim 1, characterized in that the window of the said auxiliary frame and the window of the said main frame have the same dimensions.

5. A slide mounting according to claim 1, characterized in that the said main frame is made in two parts, namely, a thick outer frame part and an interior part identical to the said auxiliary frame.

6. A slide mounting according to claim 1, characterized in that the outer edges of the said main frame have grooves of V-shaped cross section, the edges of the said covers being adapted to be folded down onto the walls of said grooves.

References Cited in the file of this patent

UNITED STATES PATENTS

| | | |
|---|---|---|
| 2,697,889 | Heim | Dec. 28, 1954 |
| 2,968,884 | Anastasio | Jan. 24, 1961 |
| 2,984,034 | Perrot | May 16, 1961 |